United States Patent Office 2,800,515
Patented July 23, 1957

2,800,515

PROCESS OF PREPARING ALKYLATED HYDROXY AROMATIC COMPOUNDS

Charles T. Hathaway, Berkshire, Mass., assignor to General Electric Company, a corporation of New York No Drawing. Application January 7, 1955,
Serial No. 480,609

7 Claims. (Cl. 260—624)

This invention relates to a new and improved method of preparing alkyl-substituted hydroxy aromatic compounds.

Alkylated hydroxy aromatic compounds and numerous methods for their preparation are now well known to the art. One of the more widely used methods involves the reaction of a hydroxy aromatic compound such as phenol with a long chain chlorinated hydrocarbon in the presence of a Friedel-Crafts type catalyst, aluminum chloride being typical. For example, in one conventional method phenol can be condensed with a chlorinated wax in the presence of Friedel-Crafts catalysts such as aluminum chloride by proper manipulation. More specifically, phenol and chlorowax are first mixed together at a temperature of about 150° F. and anhydrous aluminum chloride added sufficiently slowly while actively stirring the mixture to avoid violent foaming.

I have disclosed in my copending application, Serial No. 480,607, filed January 7, 1955, assigned to the assignee of the present invention, that the major disadvantages of prior processes, namely, excessive foaming, may be eliminated by first mixing the Friedel-Crafts catalyst and the hydroxy aromatic compound at a moderate temperature and subsequently adding a long-chain chlorinated hydrocarbon to the reaction mixture at a rate and temperature so as to avoid large concentrations of unreacted chlorinated hydrocarbon and excessive foaming. As another economic disadvantage, prior processes further require the exercise of very careful temperature control during the alkylation reaction. More particularly, introducing aluminum chloride at about 150° F., gradual heating by raising the temperature at the rate of one degree per minute up to 350° F. is required until the reaction is complete.

I now unexpectedly have found that improvement in the process of my copending application may be obtained by employing aluminum metal rather than a Friedel-Crafts catalyst such as anhydrous aluminum chloride. More specifically, I have found that substantial economic and processing advantages may be gained by employing aluminum metal in the alkylation of hydroxy aromatic compounds in a process comprising the steps of mixing aluminum metal and a hydroxy aromatic compound, such as phenol, and subsequently adding thereto a long-chain chlorinated hydrocarbon. One major advantage thereby obtained is the ease with which the aluminum metal may be handled. For example, anhydrous aluminum chloride must be handled with extreme care since slight contact with moisture results in traces of aluminum hydroxide deactivating the catalyst, thereby preventing the desired alkylation reaction from proceeding. By employing metallic aluminum, the problem of moisture contamination is substantially non-existent. Additionally, an economic advantage is gained since aluminum metal costs considerably less than anhydrous aluminum chloride.

While it is not desired to be limited to a specific theory of invention, it is believed that the aluminum reacts with the phenol at an elevated temperature to form hydrogen and aluminum phenoxide. The aluminum phenoxide subsequently equilibrates with hydrogen chloride evolved during the alkylation reaction to form aluminum monochloride diphenoxide or a mixture of aluminum chloride and phenoxide approximating this composition. Although analysis of the reaction mixture indicates that the composition is similar to the composition resulting from the use of aluminum chloride in an alkylation reaction, the present reaction cannot be considered as a Friedel-Crafts type reaction in the true sense, since metallic aluminum is not a member of the class of Friedel-Crafts catalysts.

The reactants found eminently suitable in the process of this invention include a phenolic body, a chlorinated long-chain hydrocarbon, and aluminum metal. Generally, the phenolic body may be any suitable commercial grade. Similarly, the aluminum metal may be any commercial grade of the metal in the form of powder, foil, strip, turnings, etc.

The chlorinated long-chain hydrocarbons found eminently suitable in the process of the present invention include chlorinated hydrocarbons having from about 12 to about 30 carbon atoms per molecule and a chlorine content of from about 15 to 45% of chlorine by weight of the chlorinated hydrocarbons. Included in this class are the paraffinic hydrocarbon waxes and oils of the aforesaid carbon chain lengths and chlorine contents.

The chlorinated hydrocarbons of the foregoing description may be obtained by chlorinating a hydrocarbon mixture consisting essentially of paraffinic hydrocarbons having from about 12 to about 30 carbon atoms in their molecule. Conventional chlorination techniques may be employed in which chlorine is bubbled through the hydrocarbon mixture until a desired percentage of chlorine has been absorbed. Preferably, the original hydrocarbon should contain no more than minor amounts of aliphatic unsaturation.

The degree of chlorination is important since it is by this means that the number of aromatic hydroxy nuclei introduced into the hydrocarbon chain is determined. By this means the flexibility of products subsequently made with this material as an intermediate may be controlled. For example, the higher the degree of chlorination, the lower the degree of flexibility of such products. The converse of this is similarly true.

The hydroxy aromatic compounds, preferably phenolic bodies, which may be alkylated in accordance with the process of this invention, include phenol and mono-substituted phenols, for example, mono-alkyl phenols including methyl, ethyl, propyl, etc. mono-halogenated phenols and mono-alkoxy phenols, for instance, methoxy, ethoxy, propoxy, etc. phenols.

In carrying out the present reaction, aluminum metal is gradually added to refluxing phenol, and the chlorinated hydrocarbon thereafter added to this mixture at a rate and a temperature at which large concentrations of the unreacted chlorinated hydrocarbon and excessive foaming attendant prior processes are eliminated. The temperatures maintained during the second phase of the reaction, more specifically during chlorinated hydrocarbon addition, may range from about 100° to about 200°, with a range of from about 140° to 175° C. being preferred.

Contrary to conventional methods, it has been further discovered that by employing the present process, which is even more remote since it is not a true Friedel-Crafts type reaction, the present reaction may be carried out smoothly without employing critical temperature control. More specifically, it has been found that the reaction temperature can be reached and maintained without the degree by degree control required in conventional processes, and the reaction smoothly continued until the evolution of hydrogen chloride ceases.

In carrying out the present reaction, the proportions of reactants can be varied widely. For example, when mono-alkylation is desired, the quantity of the hydroxy aromatic compound which may be employed may range from about 10 mols per chlorine atom in the chlorinated hydrocarbon to as little as 0.33 mol per chlorine atom in the chlorinated hydrocarbon when a trialkylated phenol is desired. When the alkylated products are to be employed as intermediates for condensation with other ingredients, for example, with aldehydes or other methylene-containing compounds to form resinous products, they may be prepared by having the reactants present in such proportions that the chlorine to phenol ratio is from 0.1 atom of chlorine per mol of phenol to 2.0 atoms of chlorine per mol of phenol. In those cases where excess phenol remains in the alkylation mixture, the excess phenol can be separated from the alkylated product by simple vacuum or by steam distillation.

Generally, although the quantity of aluminum which may be employed may approximate the quantity of chlorinated hydrocarbon employed on a stoichiometric basis, it generally may range from about 0.2 to 5%, by weight, based on the weight of the chlorinated hydrocarbon, with a preferred range being from about 0.4 to about 1.0%, by weight of the chlorinated hydrocarbon.

The conditions governing the reaction of this invention may be varied within certain limits. For example, reaction temperatures employed in the process may range from about 100° to about 200° C., with a preferred operating temperature being in the range of from about 140° to 175° C. The rate of addition of the chlorinated hydrocarbon to the mixture of hydroxy aromatic compounds and aluminum metal may be as rapid as desired. Generally, a preferred rate is that at which the evolved hydrogen chloride may be readily vented or absorbed in a suitable medium.

In order that those skilled in the art may more readily understand the reaction of this invention, the following examples are given by way of illustration and not by way of limitation. All parts and percentages are by weight.

*Example 1*

A chlorinated hydrocarbon was prepared by chlorinating 1500 parts of scale wax, melting point of 124° to 126° F. and having an average chain length of about 25 carbon atoms, at a temperature of 90° to 91° C. for a period of 4.5 hours. The chlorinated hydrocarbon thus obtained contained approximately 20.5% chlorine as compared to a calculated percentage of 20.6%. By analysis, it was determined that the chlorinated hydrocarbon contained an average of 2.5 chlorine atoms per $C_{25}$ chain.

To 80 parts of phenol heated to 164° C. was added about 25% of the total aluminum employed, .76 part, equivalent to 3.75 parts aluminum chloride, 2.5% by weight of chlorinated hydrocarbon. In the absence of any visible reaction after approximately 20 minutes, a small crystal of iodine was introduced and immediate and vigorous reaction ensued. The remainder of the metal was then added and the reaction was completed in approximately 20 minutes. Thereafter, 150 parts of the chlorinated hydrocarbon prepared in accordance with the first part of this example were added gradually in a 40-minute period while maintaining a reaction temperature of approximately 165° to 170° C. Hydrogen chloride evolution was quite rapid but diminished considerably approximately 4 minutes after the completion of the addition. At the end of approximately 1 hour, hydrogen chloride evolution was negligible and the reaction mixture was allowed to cool.

By steam stripping a sample, the unreacted phenol at the completion of reaction was determined to be 16% of the initial phenol and the residual chloride was determined to be 1.74% of the chlorine originally present in the hydrocarbon. This indicates that the final product was alkylated by the chlorinated hydrocarbon to the extent of 93.2% of the chlorinated hydrocarbon present to give a 1.6-19 alkylated phenol. This identification of the alkylated phenol refers to the average number of alkyl groups per phenol and the extent of arylation of the hydrocarbon. Thus, the last mentioned alkylated phenol was alkylated to the extent of 1.6 alkyl groups per phenol and the hydrocarbon was arylated to an extent of 19%.

*Example 2*

9.4 parts of aluminum metal were gradually added to 1000 parts of hot phenol and after addition of a crystal of iodine reaction was apparent at 160° to 162° C. 375 parts of the chlorinated hydrocarbon employed in Example 1 were added to the reaction mixture at a temperature of from about 149° to 173° C., principally at 152° C. in a one-hour period. At the end of one hour, hydrogen chloride evolution was negligible and the reaction mixture was allowed to cool.

By steam stripping a sample at the completion of the reaction for the determination of unreacted phenol and by the determination of residual chlorine, the alkylated phenol was found to be a 1.08-17.4 alkylated phenol. To remove the catalyst from the reaction mixture, the mass was maintained at 80° C. for several hours. The unhydrolyzed aluminum salts formed during the reaction were precipitated and removed by filtration, which procedure is more fully described and claimed in copending application Serial No. 480,608, filed January 7, 1955, and assigned to the assignee of the present invention. Alternatively, product recovery and catalyst removal may be by means of any known conventional method.

Alkylation of hydroxy aromatic compounds in accordance with the present process results in numerous advantages over the processes conventionally employed. In addition to the advantages obtained by operating in the manner of the first of my aforementioned copending applications, Serial No. 480,607, the added advantages of the present process include the elimination of the precautions required to maintain aluminum chloride anhydrous since the effect of moisture is to deactivate the material as a catalyst. Additionally, since aluminum is not corrosive, personnel hazards, such as exist in the handling of aluminum chloride, are not present. The lower cost of aluminum metal is still another advantage.

The products of the present invention have a large field of utility. For example, they may be used as pour point depressants in lubricating oils and as intermediates in the preparation of various resins and varnishes, etc.

What I claim as new and desire to secure by Letters Patent of the United States is:

1. A method of preparing alkylated hydroxy aromatic compounds which comprises the sequential steps of (1) mixing together a heated phenol having at least one unsubstituted nuclear carbon atom and a small quantity of aluminum metal, (2) adding to the resulting mixture iodine and a long-chain chlorinated aliphatic hydrocarbon containing from about 12 to about 30 carbon atoms and having from about 15 to about 45%, by weight of chlorine, at a rate which avoids large concentrations of unreacted chlorinated hydrocarbon while maintaining a reaction temperature of from about 100° to 200° C. until the evolution of hydrogen chloride has substantially ceased, and (3) recovering an alkylated phenol from the reaction products.

2. A method of preparing alkylated phenols which comprises the sequential steps of (1) mixing together a heated phenol having at least one unsubstituted nuclear carbon atom and a small quantity of aluminum metal, (2) adding to the resulting mixture iodine and a long-chain chlorinated aliphatic hydrocarbon containing from about 12 to about 30 carbon atoms and having from about 15 to 45% by weight of chlorine at a rate which avoids large concentrations of unreacted chlorinated hydrocarbon while maintaining a reaction temperature of from about 100° to about 200° C., and (3) recovering an alkylated phenol.

3. A method of preparing alkylated phenols which comprises the sequential steps of (1) mixing together a heated phenol having at least one unsubstituted nuclear carbon atom and a small quantity of aluminum metal, (2) adding to the resulting mixture iodine and a chlorinated hydrocarbon containing from about 12 to about 30 carbon atoms and having from about 15 to 45%, by weight of chlorine, at a rate which avoids large concentrations of unreacted chlorinated hydrocarbon while maintaining a reaction temperature of about 100° to about 200° C. until the evolution of hydrogen chloride has substantially ceased, and (3) recovering an alkylated phenol.

4. A method of preparing an alkylated phenol which comprises the sequential steps of (1) mixing together a heated phenol having at least one unsubstituted nuclear carbon atom and a small quantity of aluminum metal, (2) adding to the resulting mixture iodine and a chlorinated hydrocarbon containing from about 12 to about 30 carbon atoms and having from about 15 to 45%, by weight of chlorine, at a rate which avoids large concentrations of unreacted chlorinated hydrocarbon while maintaining a reaction temperature of from about 100° to about 200° C., the quantity of aluminum metal in the reaction mixture corresponding to from about 0.2 to 5.0%, by weight of said chlorinated hydrocarbon, and (3) recovering an alkylated phenol.

5. A method of preparing alkylated phenols which comprises the sequential steps of (1) mixing together a heated phenol having at least one unsubstituted nuclear carbon atom and a small quantity of aluminum metal, (2) adding to the resulting mixture iodine and a chlorinated hydrocarbon containing from about 12 to about 30 carbon atoms and having from about 15 to about 45%, by weight of chlorine, at a rate which avoids large concentrations of unreacted chlorinated hydrocarbon while maintaining a reaction temperature of from about 100° to about 200° C. until the evolution of hydrogen chloride has substantially ceased, the quantity of aluminum metal in the reaction mixture corresponding to from about 0.2 to 5.0%, by weight of said chlorinated hydrocarbon, and (3) recovering an alkylated phenol.

6. The method of claim 5 wherein the chlorinated aliphatic hydrocarbon is a paraffinic hydrocarbon wax.

7. The method of claim 5 wherein the chlorinated aliphatic hydrocarbon is a paraffinic hydrocarbon oil.

References Cited in the file of this patent

UNITED STATES PATENTS

| | | |
|---|---|---|
| 2,091,483 | Olin | Aug. 31, 1937 |
| 2,191,499 | Reiff | Feb. 27, 1940 |
| 2,211,972 | Gardiner et al. | Aug. 20, 1940 |
| 2,256,612 | Ellis | Sept. 23, 1941 |